US012734939B2

(12) United States Patent
Baker et al.

(10) Patent No.: US 12,734,939 B2
(45) Date of Patent: Sep. 15, 2026

(54) WORKING MACHINE

(71) Applicant: J. C. Bamford Excavators Limited, Uttoxeter (GB)

(72) Inventors: Simon Baker, Uttoxeter (GB); Domonic Bettany, Uttoxeter (GB); Graeme Leithead, Uttoxeter (GB)

(73) Assignee: J.C. Bamford Excavators Limited, Uttoxeter (GB)

(*) Notice: Subject to any disclaimer, the term of this patent is extended or adjusted under 35 U.S.C. 154(b) by 0 days.

(21) Appl. No.: 18/926,261

(22) Filed: Oct. 24, 2024

(65) Prior Publication Data

US 2025/0137229 A1 May 1, 2025

(30) Foreign Application Priority Data

Oct. 26, 2023 (GB) ..................................... 2316368

(51) Int. Cl.
*B60N 2/14* (2006.01)
*B60N 2/24* (2006.01)
(Continued)

(52) U.S. Cl.
CPC ............. *B60N 2/143* (2013.01); *B60N 2/146* (2013.01); *B60N 2/24* (2013.01); *B60N 2/38* (2013.01);
(Continued)

(58) Field of Classification Search
CPC .......... B60N 2/143; B60N 2/146; B60N 2/24; B60N 2/38; B60N 2002/0055; B62D 1/183; E02F 9/166
See application file for complete search history.

(56) References Cited

U.S. PATENT DOCUMENTS 5,036,942 A † 8/1991 Loewen
2006/0226685 A1* 10/2006 Priepke ................. B60N 2/143 297/344.24

(Continued)

FOREIGN PATENT DOCUMENTS

EP 4107047 A1 12/2022
EP 4545353 A1 4/2025

(Continued)

OTHER PUBLICATIONS

Examination Report and Notification of Intention to Grant, GB Application No. 2316368.6, dated Sep. 15, 2025.

(Continued)

*Primary Examiner* — Dale Moyer
(74) *Attorney, Agent, or Firm* — MARSHALL, GERSTEIN & BORUN LLP

(57) ABSTRACT

A working machine includes a steer column; and a seat that rotates a rotation path between a first position and a second position. The steer column is movable between a first position, where the steer column is operable from the seat when the seat is in the first seat position, and a second position, where there is clearance between the steer column and the seat rotation path. A seat latch arrangement retains the seat in said first seat position; and a latch control mechanism releases the seat latch arrangement. The latch control mechanism prevents release of the seat latch arrangement when the steer column is in the first position. The actuator assembly actuates the latch control mechanism, wherein the actuator assembly is operated by movement of the steer column between the first position and the second position.

20 Claims, 13 Drawing Sheets

(51) Int. Cl.

| | |
|---|---|
| ***B60N 2/38*** | (2006.01) |
| ***B62D 1/183*** | (2006.01) |
| ***E02F 9/16*** | (2006.01) |
| *B60N 2/005* | (2006.01) |

(52) U.S. Cl.
CPC .............. *B62D 1/183* (2013.01); *E02F 9/166* (2013.01); *B60N 2002/0055* (2013.01)

(56) References Cited

U.S. PATENT DOCUMENTS

| | | | | |
|---|---|---|---|---|
| 2008/0035408 | A1 * | 2/2008 | Gristenbrei .............. | B60N 2/38<br>297/344.21 |
| 2013/0193729 | A1 * | 8/2013 | VanMiddendorp ...... | B60N 2/14<br>297/311 |
| 2015/0142246 | A1 | 5/2015 | Cuddihy et al. | |

FOREIGN PATENT DOCUMENTS

| | | | | | |
|---|---|---|---|---|---|
| EP | 4107047 | B1 * | 12/2025 | .............. | B60N 2/24 |
| GB | 2457244 | A | 8/2009 | | |
| JP | 2011-251656 | A | 12/2011 | | |
| WO | WO2022173395 | A1 † | 8/2022 | | |

OTHER PUBLICATIONS

Observations from a third party after a report under s.18(4), GB Application No. 2316368.6, dated Oct. 3, 2025.
Search Report issued in GB 2316368.6, mailed Apr. 8, 2024.
Communication Pursuant to Rule 114(2) EPC, European Application No. 24208589.2, dated Oct. 21, 2025.

* cited by examiner
† cited by third party

WORKING MACHINE

FIELD

The present teachings relate to a working machine having a rotatable seat and a movable steer column.

BACKGROUND

It is well known for a working machine to have a rotatable seat. Commonly, such a seat will be rotatable between two positions 180° apart. This allows the machine operator to view the front or the rear of the working machine as required, e.g. when operating a working arm or other attachment at the front or the rear of the machine. Alternatively, the machine may need to be driven in forwards and reverse directions, e.g. on a site where turning a machine is difficult or impossible. Seat rotation through 180° facilitates such operation of the machine.

It is also known for machine operating controls such as joysticks to be positioned on the rotatable seat. For example, a joystick may be positioned on the arm of a seat. Positioning such controls on the seat allows the controls to be rotated with the seat, and so enables an operator to use the same controls in the same position regardless of the seat position.

Rotation of the seat between forwards and rearwards facing positions can bring parts of the seat such as machine operating controls into contact with other parts of the machine located in the cab during rotation. Damage to parts of the seat or other parts of the machine can thus be caused during rotation of the seat. In particular, the steer column can interfere with the rotation path of parts of the seat.

Machine operating controls such as joysticks are increasingly complex. For example, further operating controls such as buttons are included on the joystick to improve ergonomics for the machine operator, i.e. to reduce the need for the operator to reach out of their position in the seat. This can lead to an increase in the size of the joystick, thus increasing the likelihood of collision between the joystick and the steer column on rotation of the seat. In addition, a more complex joystick is more expensive and more time consuming to replace or repair. A damaged joystick can thus lead to increased machine downtime and potential project delays, making it increasingly important that collision between the joystick and the steer column is avoided.

Such seats often include suspension intended to increase comfort of the operator, such that the seat may lower when an operator sits, and rise when an operator stands. This height change of the seat and its attached components can increase the likelihood of collision during seat rotation, e.g. if the operator leaves the seat whilst the seat is out of a forward-facing position.

It is known, therefore, for the steer column to be jointed such that at least part of the steer column can be moved out of the rotation path of the seat and seat parts. For example, the steer column can be moved from a drive position, where steering controls are easily operable by a seated operator, to a park position, where the steer column is out of the seat rotation path.

Movement of the steer column from the drive position to the park position commonly requires action by the machine operator. If the machine operator fails to move the steer column from the drive position to the park position before rotating the seat, damage can be caused during seat rotation.

It is therefore known to provide a mechanism by which the steer column is moved out of the drive position and towards the park position as the seat is rotated in order to avoid collision between the two. However, such known mechanisms are complex and thus expensive to install and maintain.

The present disclosure seeks to overcome or at least mitigate the problems of the prior art.

SUMMARY

According to the first aspect of the present teaching there is provided a working machine comprising a steer column; and a rotatable seat. The seat is rotatable through a seat rotation path between a first seat position and a second seat position. The steer column is movable between a first position, where the steer column is operable from the seat when the seat is in the first seat position, and a second position, where there is clearance between the steer column and the seat rotation path.

The working machine further comprises a seat latch arrangement configured to retain the seat in said first seat position; and a latch control mechanism for controlling release of the seat latch arrangement. The latch control mechanism is configured to prevent release of the seat latch arrangement when the steer column is in the first position.

Preventing release of the seat latch arrangement prevents release of the seat from the first seat position. That is, whilst release of the seat latch arrangement is prevented, the seat is retained in the first seat position. Movement of the seat whilst the steer column is in the first, drive, position, is thus prevented. Damage to the seat, including its associated controls (e.g. a joystick), is thereby prevented.

Providing a latch control mechanism for the seat latch arrangement is a simple and effective way of controlling seat rotation, by preventing release of the seat from the retained position at a time when rotation of the seat could lead to damage to the seat or to the steer column. It is known for the rotatable seat of a working machine to be retained in the first position by a seat latch arrangement until released by an operator. A latch control mechanism can be added to the existing seat latch arrangement without significant adaptation of existing parts being required. The latch control mechanism thus provides a straightforward means of preventing seat rotation when rotation of the seat could lead to the collision of the seat or its associated parts with the steer column. In addition, use of the existing seat latch arrangement advantageously allows safety standards of seat retention to be met by that seat latch arrangement.

The actuator assembly is configured to actuate the latch control mechanism, wherein the actuator assembly is operated by movement of the steer column between the first position and the second position.

Operation of the actuator assembly being carried out by movement of the steer column avoids the need for additional steps to be carried out by the operator.

The actuator assembly may be configured to actuate the latch control mechanism to release the seat latch arrangement upon movement of the steer column to the second position.

Actuation of the latch control mechanism being carried out by movement of the steer column out of the first position provides an efficient fail-safe means of preventing release of the seat latch arrangement when the steer column is in the first position.

Advantageously, release of the seat latch arrangement is carried out concurrently with movement of the steer column from the first position to the second position, so that rotation of the seat can take place as soon as the steer column is moved from the first position to the second position. Using movement of the steer column to the second position to actuate the latch control mechanism ensures that the seat latch arrangement is released only when the steer column has been moved to the second position, i.e. so that there is clearance between the seat rotation path and the steer column, and damage will not be caused.

The actuator assembly may comprise an actuator having a first end connected to the steer column and a second end connected to the latch control mechanism.

Connection of the actuator between the steer column and the latch control mechanism enables actuation of the latch control mechanism by the steer column via straightforward means.

The actuator may comprise an inner cable housed within an outer tube. The inner cable may comprise a first end secured to the steer column and a second end secured to the latch control mechanism. The outer tube may comprise a first end secured to the steer column.

Movement of the steer column to the second position may be configured to tension the inner cable, so as to actuate the latch control mechanism.

Advantageously, the attachment of the inner cable to the steer column and to the latch control mechanism enables simple and effective actuation of the latch control mechanism upon movement of the steer column.

The actuator assembly may further comprise a pivot arrangement connected between the steer column and the actuator first end. The pivot arrangement may be configured such that movement of the steer column from the first position to the second position causes pivoting of the pivot arrangement such that the actuator actuates the latch control mechanism to release the seat latch arrangement.

Advantageously, the pivot arrangement enables the movement of the steer column to be translated and so to operate the actuator. In this way, movement of the steer column to the second position automatically releases the seat and allows rotation thereof.

The actuator may comprise an inner cable housed within an outer tube. The inner cable may comprise a first end secured to the pivot arrangement and a second end secured to the latch control mechanism. The outer tube may comprise a first end secured to the pivot arrangement. The pivot arrangement may be configured to tension the inner cable upon movement of the steer column to the second position, so as to actuate the latch control mechanism.

Attachment of the inner cable to the pivot arrangement and to the latch control mechanism enables simple and effective actuation of the latch control mechanism upon movement of the steer column to the second position.

The pivot arrangement may comprise a plate configured to pivot about a pivot point, wherein the plate has a first end connected to the steer column, and a second end to which the inner cable first end is secured. The plate first end may be connected to the steer column so as to pivot about the pivot point upon movement of the steer column to the second position, so as to cause the plate second end to pivot about the pivot point, so as to tension the inner cable.

Such a pivot arrangement is a relatively simple and effective means of translating movement of the steer column to the second position into operation of the latch control mechanism via the actuator.

The pivot arrangement may comprise a member secured to the plate, and a cam configured to act upon the member to pivot the plate about the pivot point upon movement of the steer column to the second position.

Use of a cam to actuate pivoting of the plate about the pivot point is a simple and effect means of transferring movement of the steer column to actuation of the latch control mechanism.

The working machine may further comprise a cab floor. The actuator assembly may extend at least in part beneath the cab floor.

Location of the actuator assembly, or part thereof, beneath the cab floor keeps the actuator out of the way and reduces the likelihood of damage.

The steer column may be jointed, such that the steer column may comprise a fixed part, and a movable part configured to be moved between the first position and the second position.

The seat latch arrangement may comprise a latch release configured to release the seat latch arrangement. The latch control mechanism may be configured to control operation of the latch release.

Controlling operation of the latch release is a simple and effective means of preventing release of the seat latch arrangement. A latch release is a common component on such a rotatable seat, so that advantageous use of existing components is made. Cost and complexity is thus minimized.

The latch control mechanism may have a closed position in which operation of the latch release is inhibited, such that release of the seat latch arrangement is prevented, and an open position, in which operation of the latch release is enabled.

Inhibiting movement of the latch release is a simple and effective means of preventing release of the seat latch arrangement.

The latch release may be a pivotable lever.

A latch release in the form of a pivotable lever has the advantage of being easily operated by the operator.

The latch control mechanism may comprise a recess configured to receive the latch release. The recess may be movable between a first position in which operation of the latch release is inhibited, and a second position in which operation of the latch release is enabled.

The recess provides a simple and effective means of preventing or inhibiting operation of the latch release.

The latch control mechanism may comprise a plate, wherein the plate defines the recess. The plate may be pivotable between a first plate position where the recess is in said first position, and a second plate position where the recess is in said second position.

Such an arrangement advantageously allows the latch control mechanism to be fitted around existing components such as the latch release.

The actuator second end may be secured to the plate. The actuator may be configured to actuate pivoting of the plate from the first plate position to the second plate position.

The plate being pivotable between first and second positions enables a simple and effective actuator, e.g. of the cable type, to be used.

The plate may be resiliently biased towards the first plate position.

The latch control mechanism may be resiliently biased towards a closed position, where release of the seat latch arrangement is prevented.

Resilient biasing of the latch control mechanism to a closed position provides automatic prevention of movement.

The working machine may further comprises a steer column retention mechanism configured to retain the steer column in the first position, and/or in the second position.

The steer column retention mechanism prevents unwanted movement of the steer column from the first and/or second position.

The working machine may further comprise a steer column release mechanism configured to release the steer column from the first position and/or from the second position.

The steer column release mechanism may be configured to be operable by an operator's foot.

The steer column retention mechanism being foot operated makes it quick and easy for the operator to release the steer column from the retention mechanism in order to move the steer column from the path of rotation of the seat.

The first and second seat positions may be substantially 180° from one another.

The seat may comprise an arm-mounted control, such as a joystick.

The actuator assembly may comprise a hydraulic actuator.

The actuator assembly may comprise an electrically operated actuator.

There is further provided a method of releasing the seat latch arrangement of a working machine as set out above, the method including the step of moving the steer column from the first position towards the second position.

The method may include the step of moving the steer column into the second position.

BRIEF DESCRIPTION OF THE DRAWINGS

Embodiments disclosed herein will now be described, by way of example only, with reference to the accompanying drawings, in which.

DETAILED DESCRIPTION

In the following detailed description, numerous specific details are set forth in order to provide a thorough understanding of various embodiments and the inventive concept. However, those skilled in the art will understand that: the present invention may be practiced without these specific details or with known equivalents of these specific details; that the present invention is not limited to the described embodiments; and, that the present invention may be practiced in a variety of alternative embodiments. It will also be appreciated that well known methods, procedures, components, and systems may not have been described in detail.

References to vertical and horizontal in the present disclosure should be understood to be in relation to the machine when stood on horizontal ground in a non-working condition. The term axial is generally used in relation to the longitudinal axis of the machine. The term width is generally used in relation to the longitudinal length, that is, transverse to the length.

Figure 1:
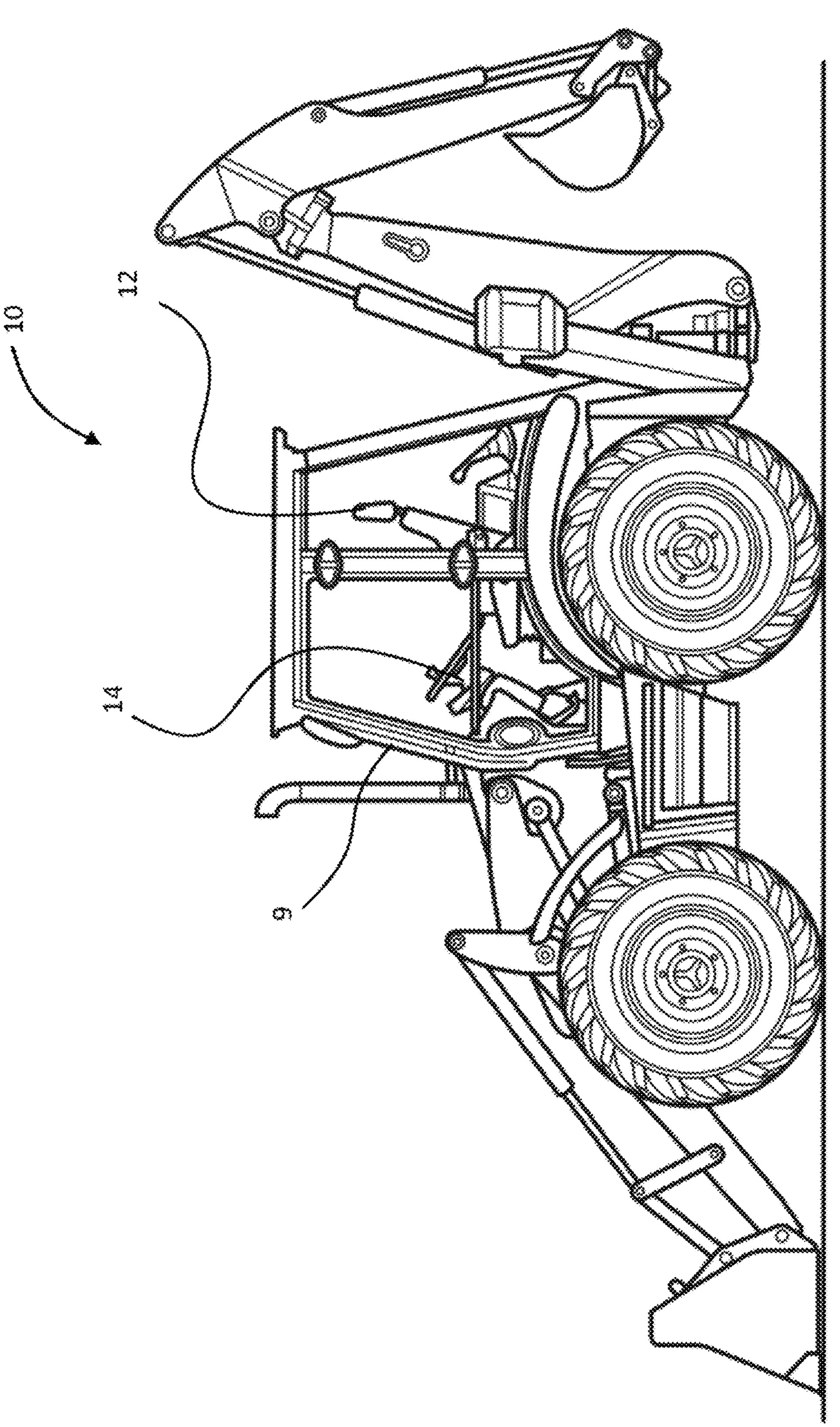
FIG. 1 is an isometric view of a working machine including a seat latch arrangement according to the present teachings.
Figure 2:
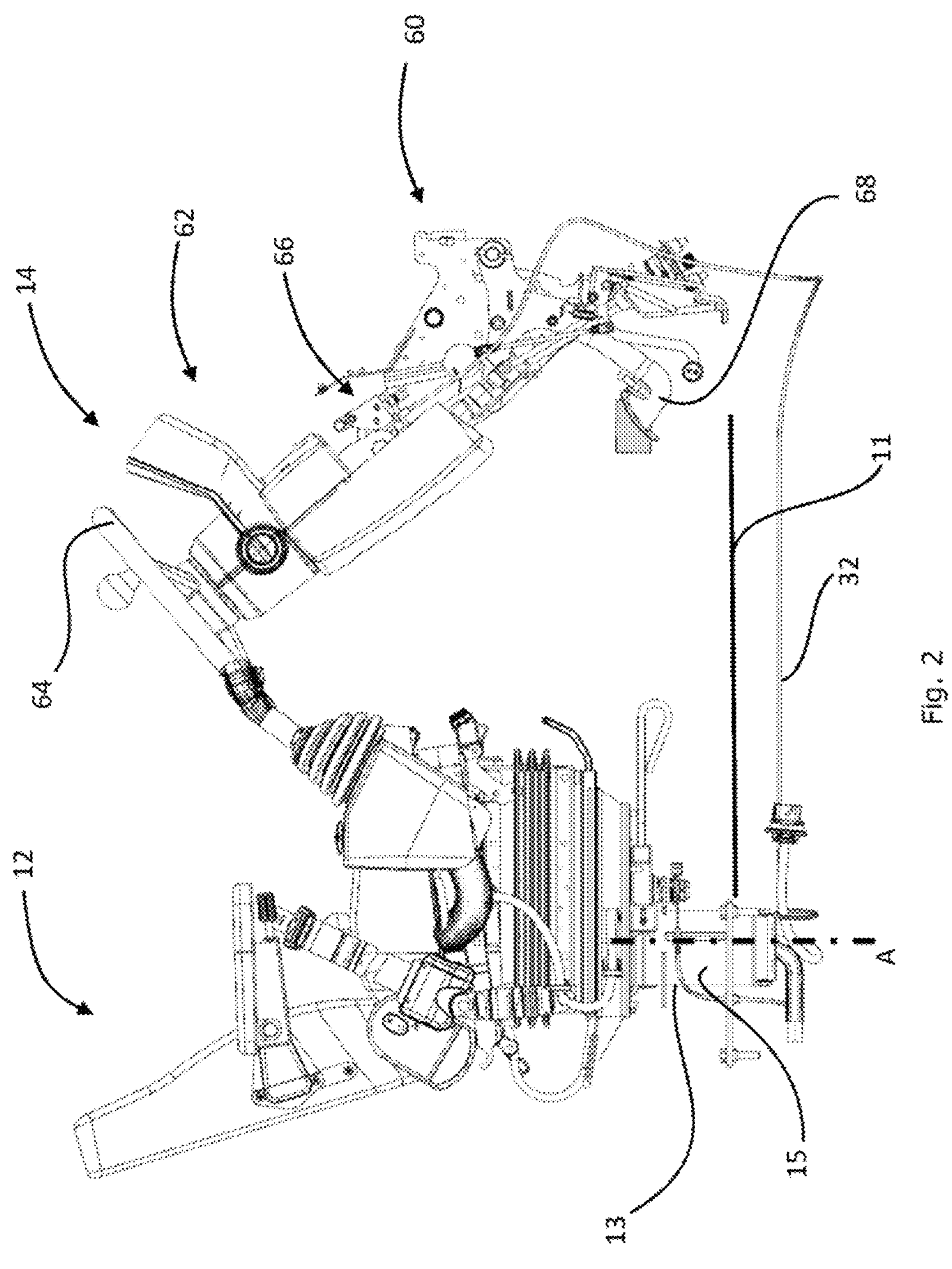
FIG. 2 is a side view of a seat and a steer column of the working machine of FIG. 1 according to an embodiment of the present teachings, with the steer column in a first position.
Figure 3:
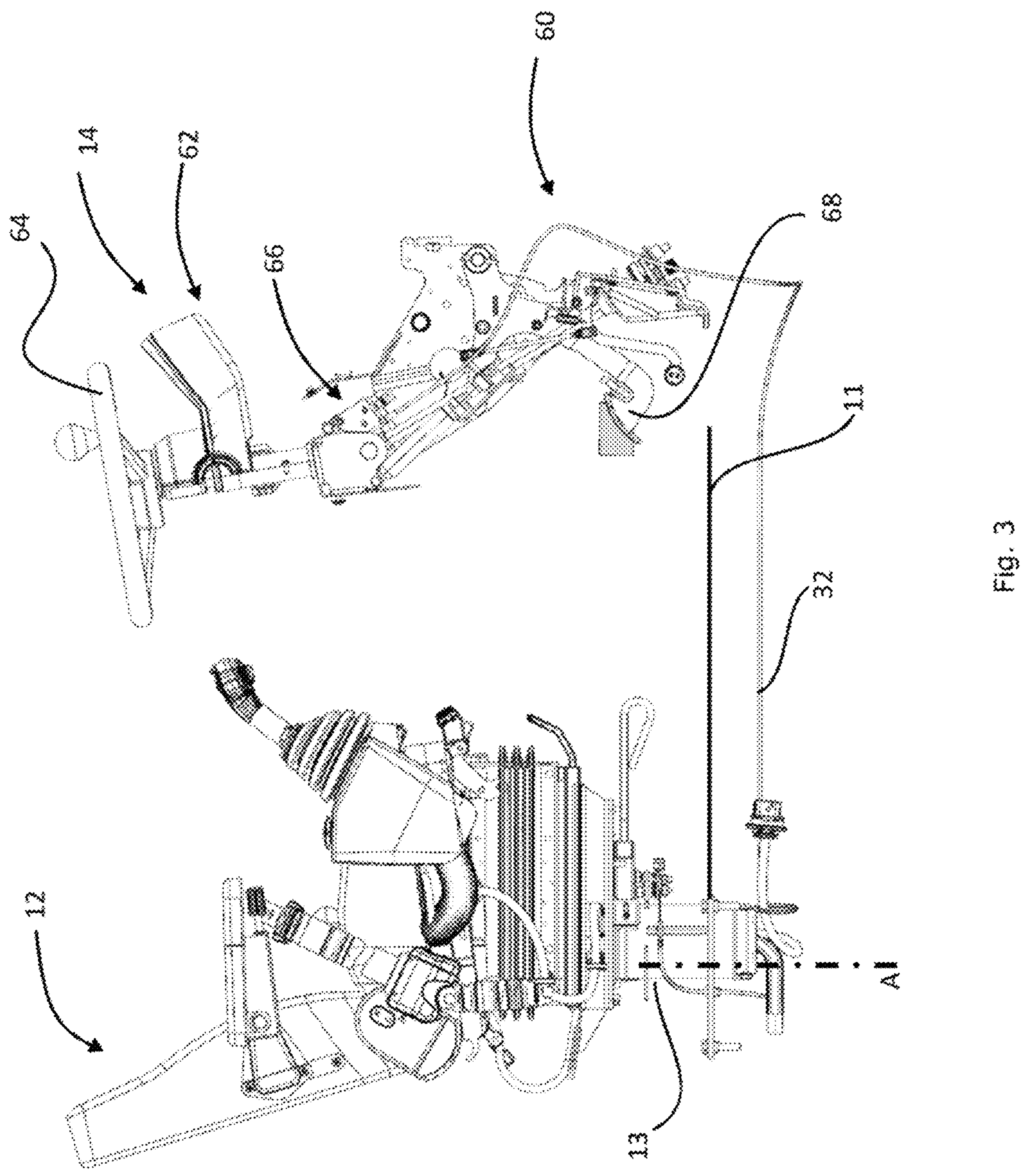
FIG. 3 is a side view of the seat and steer column of FIG. 3, with the steer column in a second position.

With reference to FIGS. 1 to 3, an embodiment of the teachings includes a working machine 10 having a rotatable seat 12 and a steer column 14 located in a cab 9. The seat 12 is rotatable through a seat rotation path about an axis A, such that a seated operator can adjust the position of the seat for reasons of machine operation or visibility. The seat 12 is shown in FIGS. 2 and 3 in a first, forward-facing seat position, facing towards the steer column 14. The seat 12 is rotatable out of the first seat position to the second seat position, which may be 180° from the first seat position, for example if an operator wishes to move the working machine 10 in a rearwards direction. Alternatively, the second seat position may be some other seat position into which an operator wishes to rotate the seat 12.

The steer column 14 is movable between a first, drive, position, shown in FIG. 2, where the steer column 14 is operable from the seat 12 when the seat 12 is in the first seat position; and a second, park, position, as shown in FIG. 3. When the steer column 14 is in the second position there is clearance between the steer column 14 and the seat rotation path. That is, when the steer column 14 is in the second position, upon rotation of the seat 12 neither the seat 12 nor components such as controls that are secured to the seat 12 and rotate with the seat 12 would come into contact with any part of the steer column 14.

Figure 5:
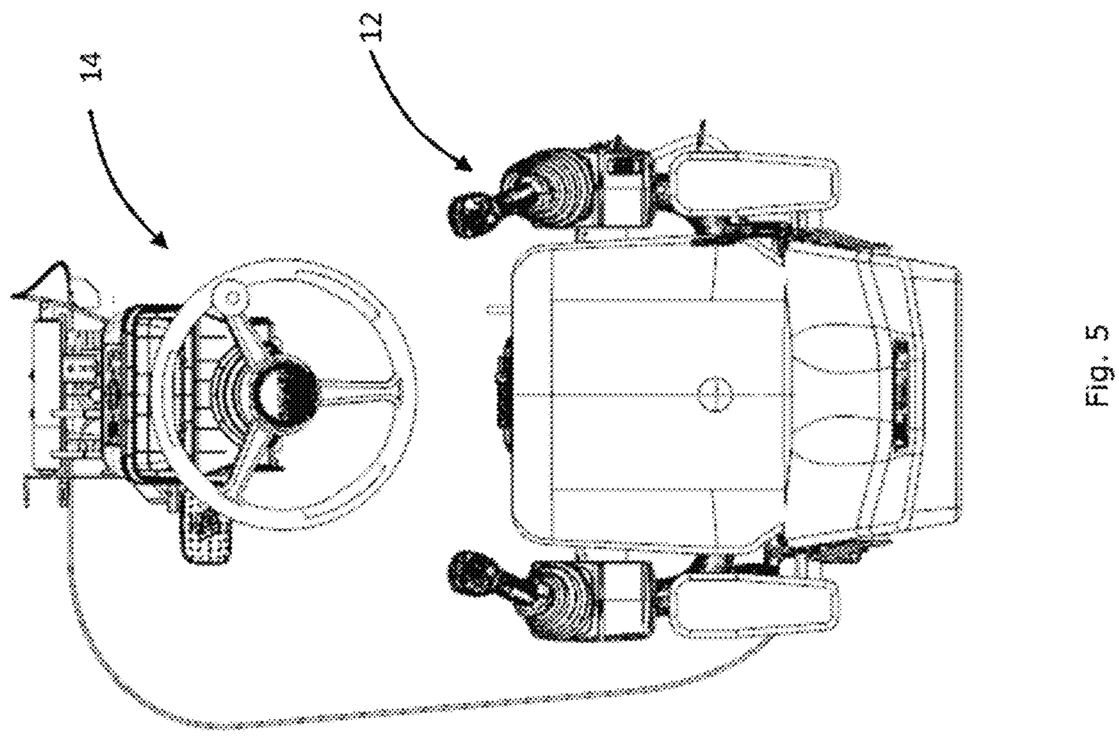
FIG. 5 is a plan view of the seat and steer column of FIGS. 2-4, with the steer column in the second position.
Figure 4:
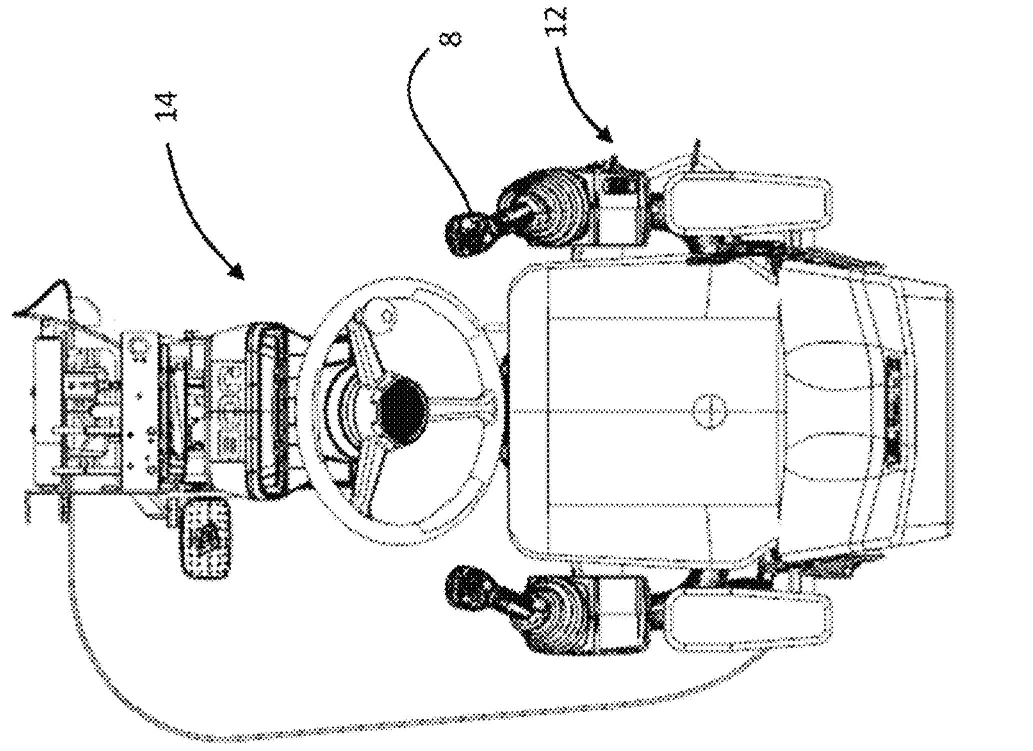
FIG. 4 is a plan view of the seat and steer column of FIGS. 2 and 3, with the steer column in the first position.

The first and second positions of the steer column 14 are shown in plan view in FIGS. 4 and 5 respectively. It can be seen from FIGS. 3 and 5, where the steer column 14 is in the second position, that if the seat 12 were to be rotated about the axis A, shown as point A in FIG. 5, there is a clearance path between the steer column 14 and the seat 12, including components such as joysticks 8 that rotate with the seat 12 about the point A.

As shown in FIGS. 2 and 3, the seat 12 is supported in the cab 9 upon a base 13. The base 13 is of a turntable type, i.e. selectively rotatable, such that the seat 12 is selectively rotatable. The base 13 has a fixed outer portion 15.

Figure 8:
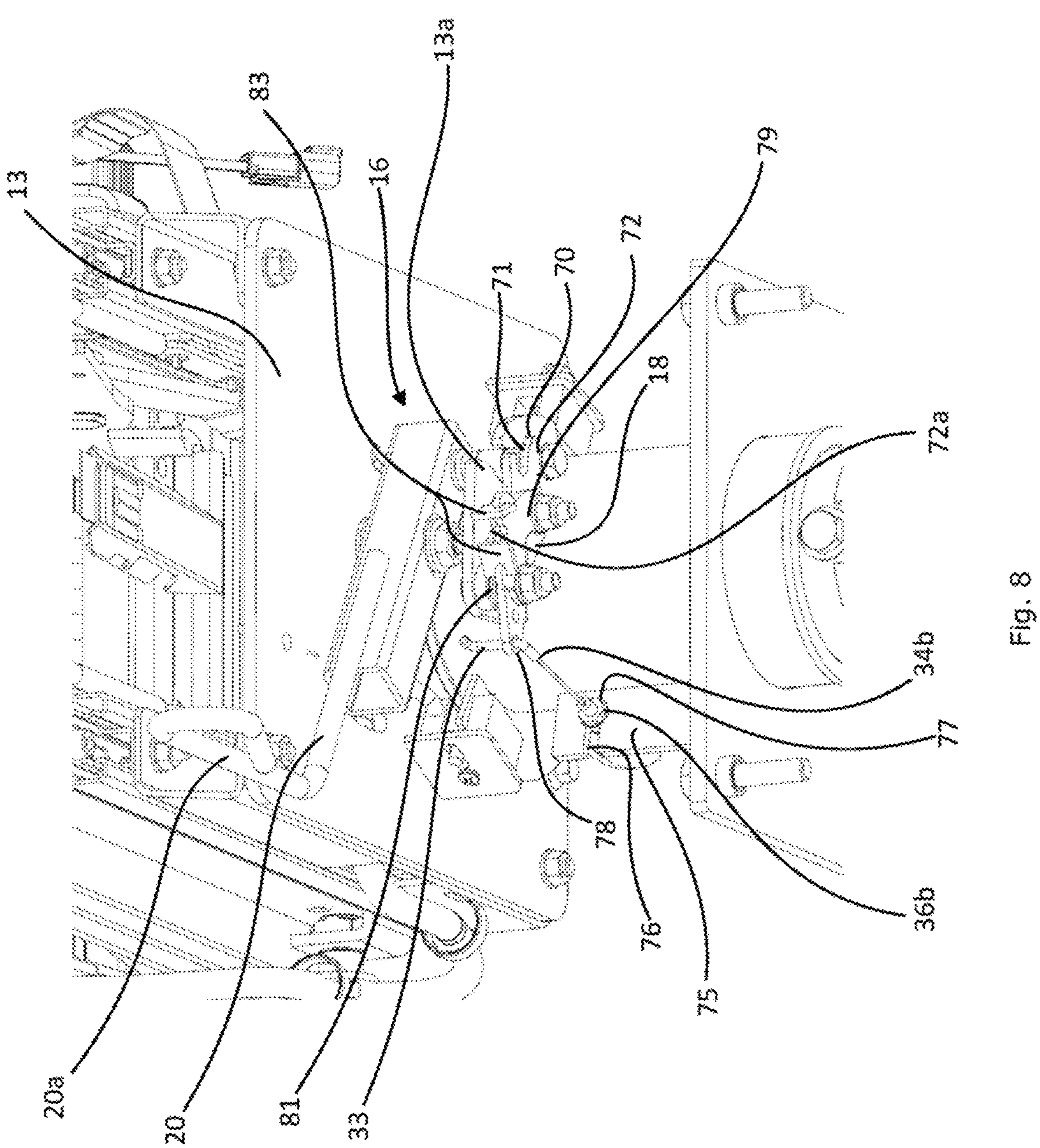
FIG. 8 is a detailed view of a seat latch arrangement according to the embodiment of the present teachings, including a latch control mechanism in an open position.
Figure 9:
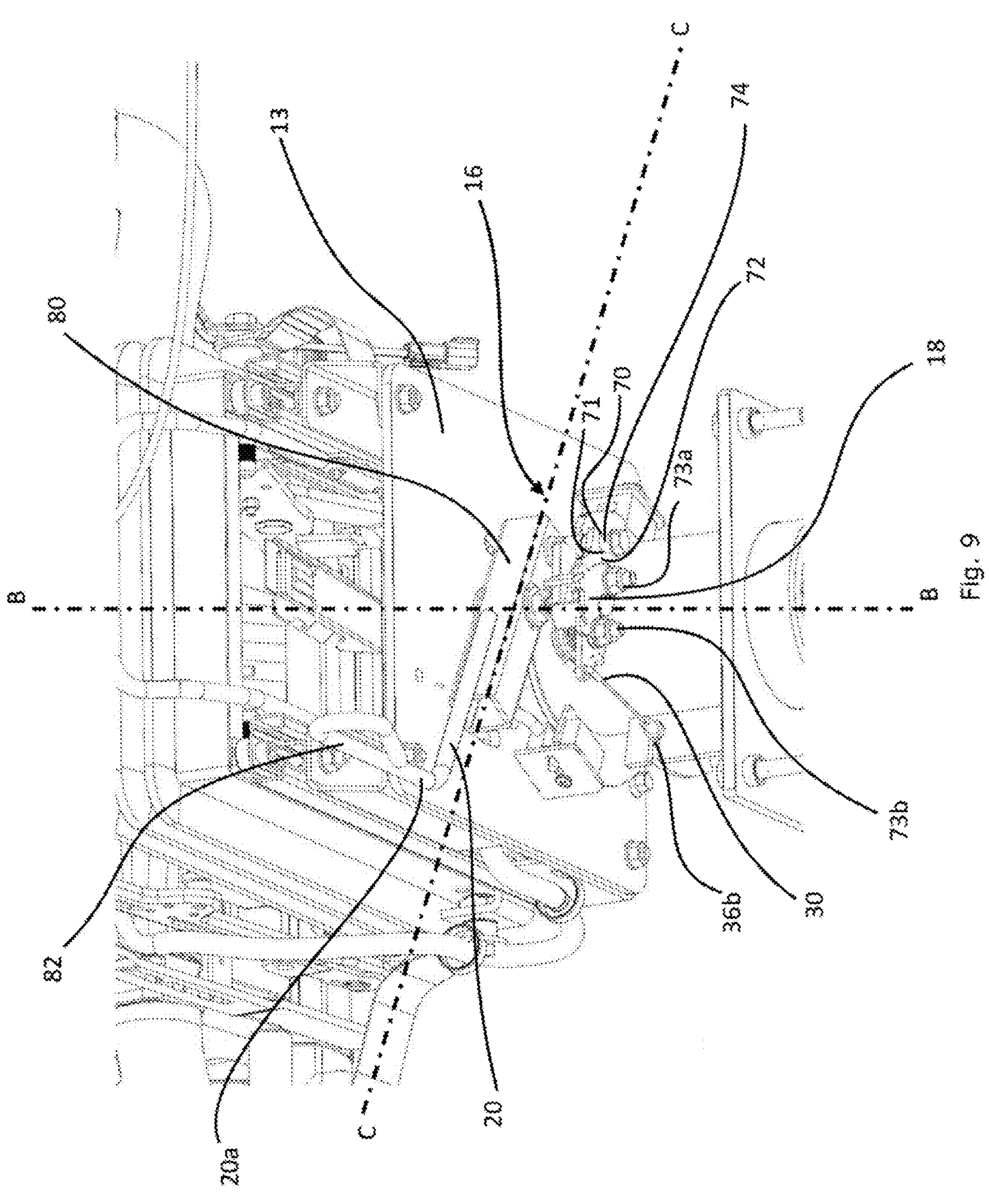
FIG. 9 is a detailed view of the seat latch arrangement of FIG. 8, where the latch control mechanism is in a closed position.

Rotation of the base 13, and so of the seat 12, is selectively prevented by a seat latch arrangement 16, shown in FIGS. 8 and 9. That is, the seat latch arrangement 16 is configured to retain the seat 12 in the first seat position. The seat latch arrangement 16 of this embodiment is of a known type, and so conforms to the required safety standards for such seat latch arrangements.

The working machine 10 has a latch control mechanism 18 by which the seat latch arrangement 16 can be released. The latch control mechanism 18 is also known, and also meets safety requirements. The latch control mechanism 18 is operable by the machine operator to release the latch arrangement 16 when rotation of the seat 12 out of the first position is desired. Rotation of the seat 12 can then be carried out by the operator.

The latch control mechanism 18 of this embodiment is configured to prevent release of the seat latch arrangement 16 when the steer column 14 is in the first position.

Preventing release of the seat latch arrangement 16 when the steer column 14 is in the first position, where rotation of the seat 12 could lead to components of the seat 12 and the steer column 14 coming into contact with one another, with damage potentially being caused, advantageously allows said seat rotation to be prevented. A fail-safe is provided whereby the operator cannot rotate the seat 12 while the steer column 14 is in the first position. The steer column 14 must be moved to the second position in order for rotation of the seat 12 to take place. Potential damage to the seat 12 and the steer column 14 due to a collision of the two is thus prevented.

Advantageously, using known mechanisms such as the seat latch arrangement and latch control mechanism provides a simple and effective means of preventing such damage. Limited additional components are required, keeping costs and complexity low.

Figure 6:
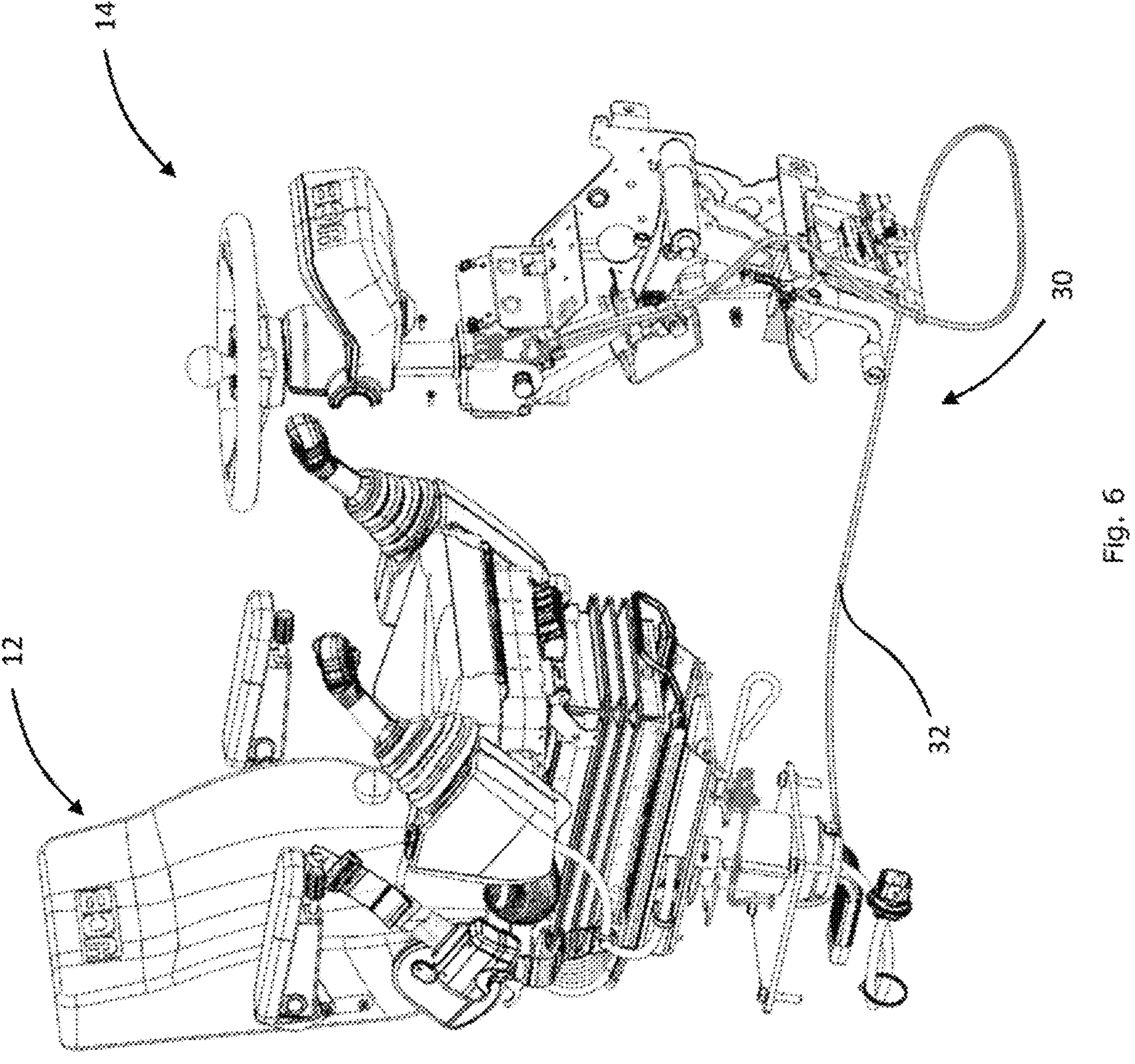
FIG. 6 is an isometric view of the seat and steer column of FIGS. 2-5, with the steer column in the second position.
Figure 7:
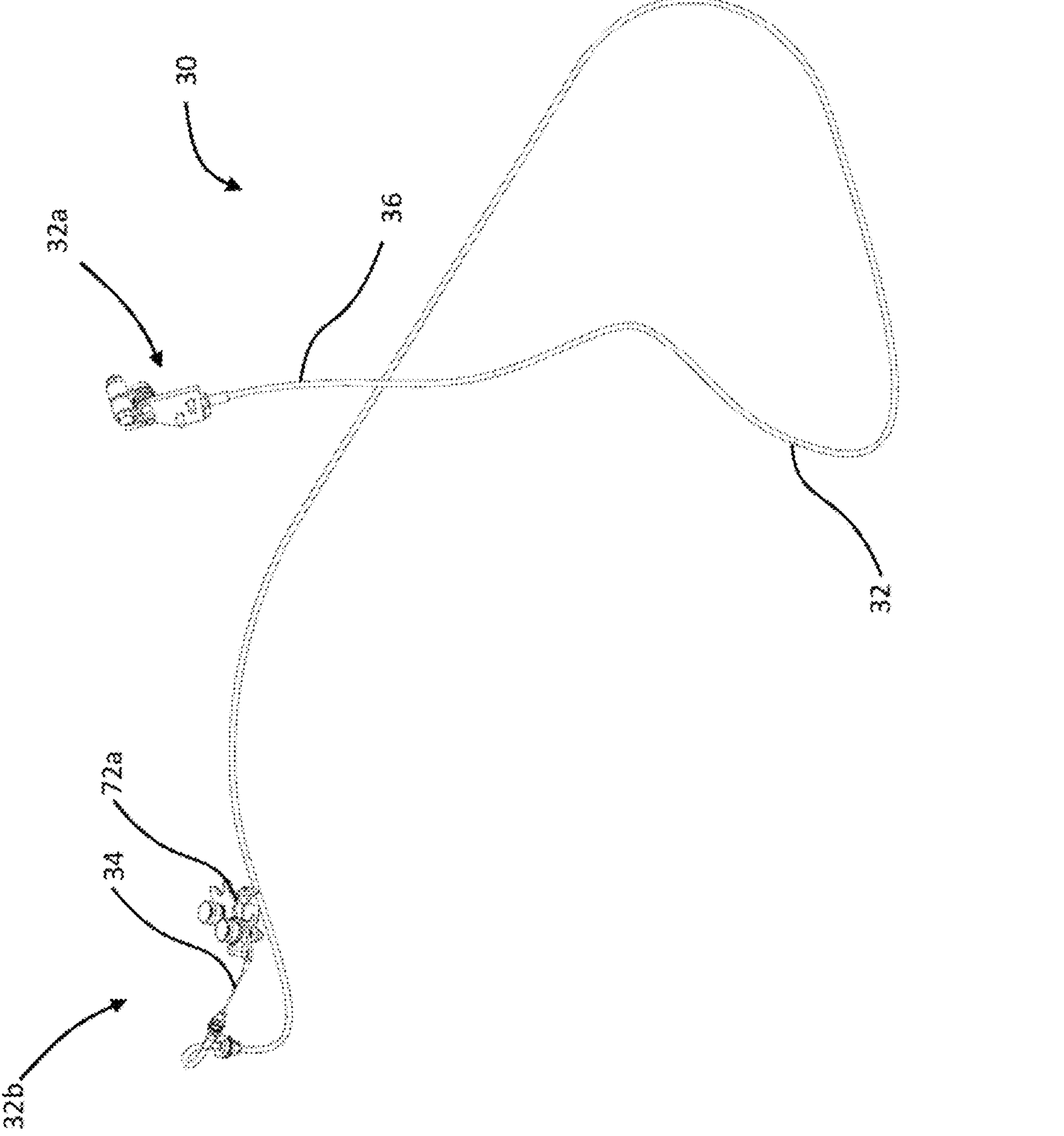
FIG. 7 is a detailed view of an actuator assembly according to the embodiment of the present teachings shown in FIGS. 2-6.

The working machine of this embodiment has an actuator assembly 30, shown in isolation in FIG. 7, and in relation to the seat 12 and steer column 14 in FIG. 6. The actuator assembly 30 is configured to actuate the latch control mechanism 18, such that the actuator assembly 30 is configured to control release of the seat latch arrangement 16. In this embodiment, the actuator assembly 30 is operated by movement of the steer column 14 between the first position and the second position. That is, the seat latch arrangement 16 is controlled, i.e. released, by movement of the steer column 14 out of the first position. In this embodiment, the seat latch arrangement 16 is released upon movement of the steer column 14 into the second position, i.e. where there is clearance. In one embodiment, the seat latch arrangement 16 is released upon movement of the steer column into a park position.

A fail-safe mechanism is therefore provided, as the seat 12 cannot be rotated until the steer column 14 is moved to the second position, i.e. where rotation of the seat 12 can take place without causing damage to the seat 12 or the steer column 14. Movement of the steer column 14 to the second position causing actuation of the latch control mechanism 18 and thereby release of the seat latch arrangement 16 is efficient, as no additional step need be taken by the operator.

The actuator assembly 30 of this embodiment incorporates an actuator 32. The actuator 32 has a first end 32*a* connected to the steer column and a second end 32*b* connected to the latch control mechanism 18. This physical connection between the steer column 14 and the latch control mechanism 18 is a convenient means of enabling movement of the steer column 14 from the first position to the second position to activate release of the seat latch arrangement 16.

The actuator 32 of this embodiment is a cable of the type commonly referred to as a "Bowden cable". That is, the actuator is an inner cable 34 housed within an outer tube 36.

The inner cable 34 has a first end 34*a* secured to the steer column 14 (see FIGS. 10, 11 and 12), and a second end 34*b* connected to a latch control mechanism 18.

Figure 12:
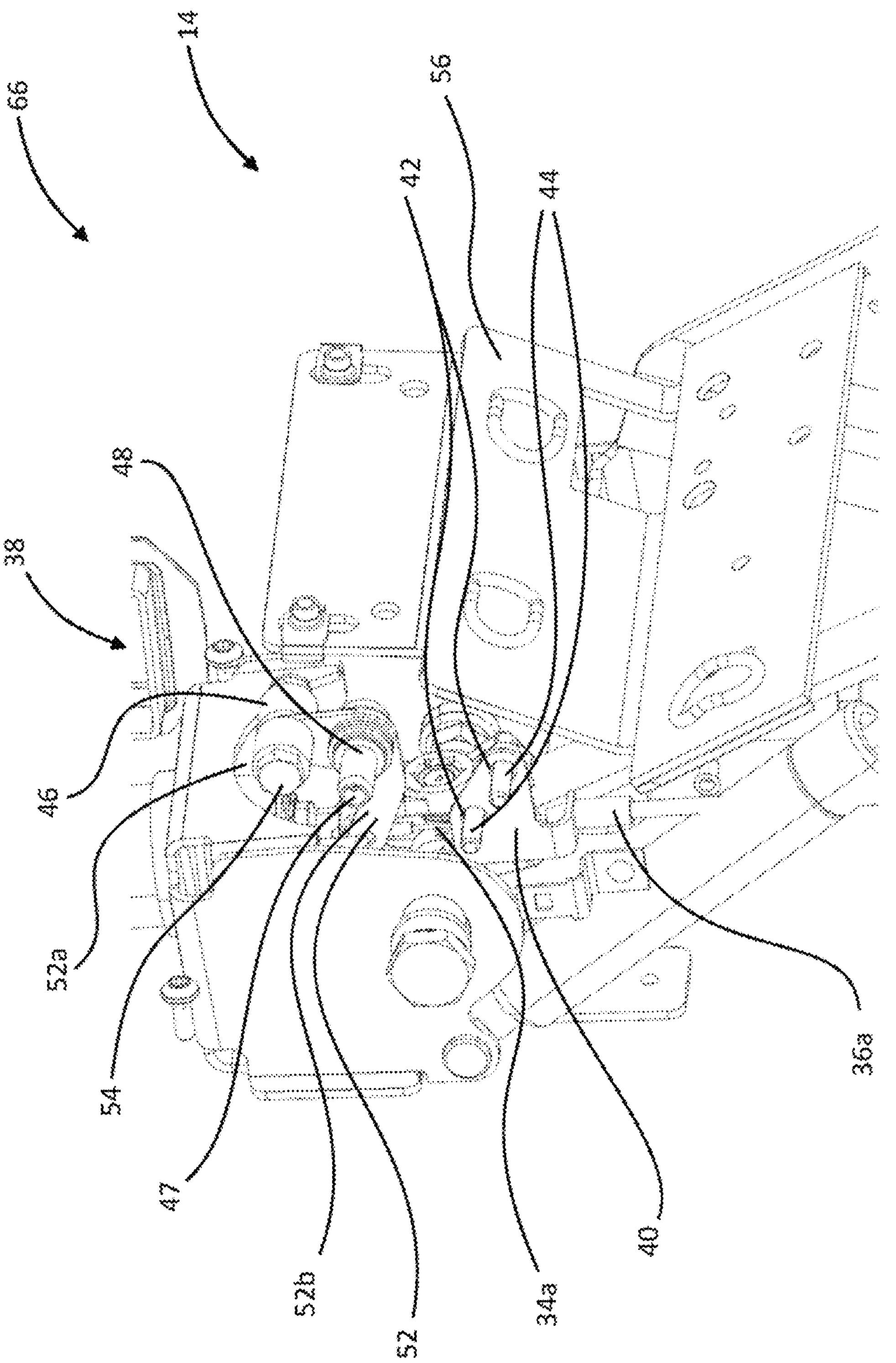
FIG. 12 is a detail, partial view of the steer column and the actuator assembly of the embodiment of FIGS. 2-11.
Figure 13:
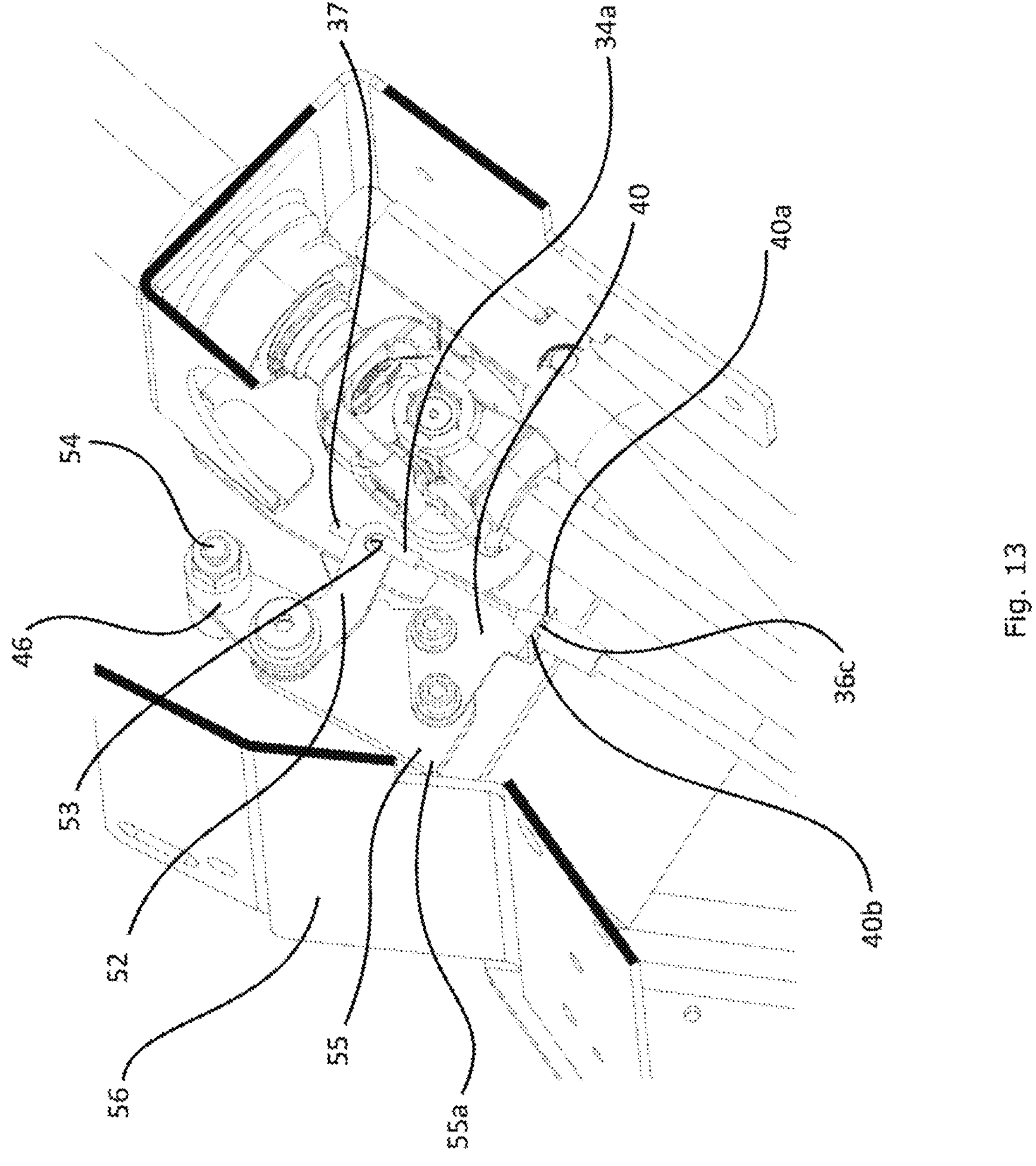
FIG. 13 is a further detail, partial view of the steer column and the actuator assembly of FIG. 12.

The outer tube 36 has a first end 36*a* secured to the steer column 14, as shown in FIG. 12, and a second end 36*b* secured to the seat 12, as shown in FIG. 9. In this embodiment, the second end 36*b* is secured to the seat base 13.

Movement of the steer column 14 to the second position tensions the inner cable 34 in relation to the outer tube 36, and so actuates the latch control mechanism 18. That is, the actuator 32 operates movement of the latch control mechanism 18 from the closed position to the open position, upon movement of the steer column 14 to the second position. The latch release 20 can then be used by the operator to release the seat latch arrangement 16, and the seat 12 can be rotated by the operator.

The actuator assembly 30 of this embodiment includes a pivot arrangement 38 between the steer column 14 and the actuator first end 34*a*. The pivot arrangement 38 connects the actuator 34 to the steer column 38.

The pivot arrangement 38 is pivotably secured to the steer column 14. Upon movement of the steer column 14 from the first position to the second position, the pivot arrangement is pivoted such that the actuator 32 actuates the latch control mechanism 18 to release the seat latch arrangement 16.

As shown in FIG. 12, the pivot arrangement of this embodiment has a pivot point 46 and a member 48 connected to the pivot point 46 and configured to pivot about the pivot point 46.

The member 48 is pivotably secured to the pivot point 46 by a plate 52. The plate 52 is pivotably secured to the pivot point 46, such that the member 48 is pivotable about the pivot point 46. The plate 52 of this embodiment is substantially L shaped. In alternative embodiments, the plate is of some other shape. The shape of the plate is configured to fit the space envelope of and around the steer column 14.

The plate 52 has a first end 52*a* pivotably secured to the steer column 14 at the pivot point 46. In this embodiment, the plate first end 52*a* is secured to the steer column 14 at the pivot point 46 by a fastener 54. In alternative embodiments, some other suitable pivotable attachment is used.

The plate 52 has a second end 52*b* to which the inner cable first end 34*a* is secured, such that the inner cable first end 34*a* is moved as the plate second end 52*b* is pivoted about the pivot point 46. The plate 52 defines an aperture 53 through which the first end 34*a* extends. In this embodiment, the inner cable first end 34*a* includes a rigid portion 37 that extends through the aperture 53. The rigid portion 37 is substantially S-shaped. This shape serves to retain the inner cable first end 34*a* in the aperture 53.

The plate 52 is pivoted about the pivot point 46 upon movement of the steer column 14 from the first position to the second position. A cam plate 55 is connected to the member 48, which extends through an aperture defined by the cam plate 55. The cam plate 55 is connected to the member 48 such that movement of the cam plate causes pivoting of the plate 52 about the pivot point 46. The cam plate 55 is located such that movement of the steer column 14 from the first position to the second position brings a cam portion 55*a* of the cam plate 55 into contact with a housing portion 56 of the steer column 14, thus effecting movement of the cam plate 55 and so pivoting of the plate 52 about the pivot point 46. The inner cable first end 35*a* is tensioned by pivoting of the plate 52, and so the actuator 32 releases the seat latch arrangement 16.

As shown in FIG. 12, the outer cable first end 36*a* is secured to the pivot arrangement, and thus to the steer column 14, via a plate 40. The plate 40 defines two apertures 42 each configured to receive a fastener 44 of the pivot arrangement 38. A neck 36*c* of the outer cable first end 36*a* is received within a slot 40*a* defined by a substantially perpendicular projection 40*b* of the plate 40. The outer cable first end 36*a* is thereby secured to the plate 40 such that the inner cable 34 is movable with respect to the outer cable 36, upon pivoting of the plate 52.

In this embodiment, the cam plate 55 is secured to the plate 40 by means of the fasteners 44.

Such a pivot arrangement thus provides a simple mechanism by which the movement of the steer column to the second position results in release of the seat latch arrangement.

As shown in FIGS. 2 and 3, the working machine has a cab floor 11. The actuator assembly 30 of this embodiment extends at least in part beneath the cab floor 11.

In this embodiment, the actuator 32 extends for at least part of its length beneath the cab floor 11.

The actuator 32 being arranged beneath the cab floor 11, e.g. following the path shown in FIGS. 2 and 3, allows the actuator 32 to be inhibited from interfering with the operator or controls of the cab, and so reduces the likelihood of damage. An advantage of the type of actuator used, i.e. the cable 32, is that it can be extended beneath the cab floor 11 in such a way whilst running between the seat 12 and the steer column 14.

The steer column 14 of this embodiment is jointed. That is, the steer column 14 has a fixed part 60 by which the steer column is secured to the cab floor 11, and a movable upper part 62 upon which the means of steering 64 is mounted, e.g. a steering wheel 64.

A universal joint 66 connects the fixed part 60 and the movable part 62. Such a steer column 14 is well known. The universal joint 66 enables the movable part 62 to be moved from the first position, as shown in FIG. 2, to the second position, as shown in FIG. 3, by the operator. As is also well known, operation of movement of the movable part 62 from the first position to the second position and back to the first position is enabled by operation of a foot pedal 68. In alternative embodiments, some other suitable means of moving the movable part 62 between the first and second positions is provided.

Advantageously, standard parts, i.e. the universal joint 66 between fixed and movable parts 60, 62 of the steer column 14, are utilized to prevent unsafe rotation of the seat, i.e. rotation of the seat when the steer column 14 is in the first position where damage to the seat and/or associated components could be caused should the seat be rotated.

In this embodiment, the seat latch arrangement 16 comprises a latch release 20. The latch release 20 is the means by which the seat latch arrangement 16 is released by the operator, so as to permit rotation of the seat 12 out of the first seat position. The latch control mechanism 18 is configured to control the mechanism of the latch release 20. Controlling operation of the latch release 20 is a simple and effective means of preventing unwanted rotation of the seat 12 by the operator, advantageously using known, existing components such as the seat latch arrangement 16 and the latch release 20.

The latch control mechanism 18 of this embodiment has a closed position as shown in FIG. 8. In the closed position, the latch control mechanism 18 prevents, or at least inhibits, operation of the latch release 20, so that release of the seat latch arrangement 16 is prevented. The latch control mechanism 18 is movable to an open position, as shown in FIG. 9, where the operation of the latch release 20 by the operator is enabled and so where the seat latch arrangement 16 can be released, and the seat 12 is rotatable out of the first position.

In this embodiment, as shown in FIG. 8, the latch release 20 is pivotably secured to the seat 12 at an axis B, such that pivoting of the latch release 20 about axis B results in pivoting of the seat latch arrangement 16 to release the seat 12 and allow rotation thereof.

With reference now to FIGS. 8 and 9, the latch control mechanism 18 will be described in further detail. In this embodiment, the latch control mechanism comprises a recess 70 configured to receive the latch release 20. The recess 20 is movable between a first position in which operation of the latch release 20 is inhibited, and a second position in which operation of the latch release 20 is enabled.

In this embodiment, the latch control mechanism 18 comprises a plate 72 that defines the recess 70. The recess 70 is defined by recess walls 71. The latch release 20 includes a pin 74 extending from the latch release. In this embodiment, the latch release 20 has a first end 20*a* configured for actuation by the operator, and a second end 20*b*. The pin 74 is positioned proximal the second end 20*b*, such that the axis B is between the pin 74 and the first end 20*a*. In this embodiment, the latch release 20 comprises a body 80 and an extension portion 82 secured to the body. The latch release first end 20*a* comprises at least part of the extension portion 82, angled with respect to a longitudinal axis C of the body 80 for ease of use by the operator. In this embodiment, the pin 74 is secured to the body 80.

In a first position, as shown in FIG. 9, the pin 74 is received within the recess 70, and movement thereof is inhibited or prevented by the recess walls 71. In a second position, shown in FIG. 8, the recess 70 is moved away from the pin 74, and the latch release 20 can be operated to release the seat latch arrangement 16.

The plate 72 is pivotably secured to a plate 13*a* of the base 13 by two fasteners 73*a*, 73*b*. The plate 72 is pivotable about the fastener 73*a* between a first plate position, shown in FIG. 9, where the recess 70 is in said first position, and a second plate position, shown in FIG. 8, where the recess 70 is in said second position. A slot defined by the plate 72 (not shown) through which the fastener 73*b* extends allows the plate 72 to pivot about the fastener 73*a*.

As shown in FIG. 8, the seat comprises a plate 75 defining a slot 76 in which the actuator outer cable second end 36*b* is received. The outer tube second end 36*b* is secured to said plate 35 by a fastener 77, such that the inner cable 34 is movable with respect to the outer tube 36.

As shown in FIG. 8, the plate 72 defines an aperture 78 in which the inner cable second end 34*b* is received. The inner cable second end 34*b* includes a rigid portion 33 that extends through the aperture 78. The rigid portion 33 is substantially S-shaped. This shape serves to retain the inner cable second end 34*b* in the aperture 78.

In alternative embodiments, the actuator is secured to the latch control mechanism by some other arrangement.

A retention plate 79 retains the plate 72 and is secured by the fasteners 73*a*, 73*b* to the base plate 13*a*. In this embodiment, the retention plate 79 is substantially C-shaped. The retention plate 79 includes first and second stops 83 for restricting the range of pivotable movement of the latch plate 72. In this embodiment, the first and second stops 83 are in the form of plates orientated substantially perpendicular to the retention plate 79. The first and second stops 83 are received within corresponding slots in the retention plate 79 in an interference fit. In alternative embodiments, some other suitable type of slot is provided.

In this embodiment, the latch plate 72 includes a protrusion 72*a* (see FIG. 7) that extends between the first and second stops 83. As the latch plate 72 is pivoted between the first and second positions, the protrusion 72*a* comes into contact with the first or second stop 83, such that pivoting of the latch plate 72 is restricted.

When the inner cable 34 is tensioned by movement of the steer column 14 as described above, the latch control mechanism plate 72 is pivoted to the second position of FIG. 8, and operation of the latch release is enabled.

In this embodiment, the latch control mechanism 18 is resiliently biased towards the closed position of FIG. 8. In this embodiment, the plate 72 is resiliently biased towards the first plate position, i.e. such that the latch control mechanism 18 is biased towards the closed position. In this embodiment, the latch control mechanism 18 includes a spring 81 on each fastener 73*a*, 73*b* configured to act between the latch plate 72 and the base 13 and so resiliently bias the latch plate 72 to the first position. In alternative embodiments, some other suitable means of resilient bias is provided.

Figure 11:
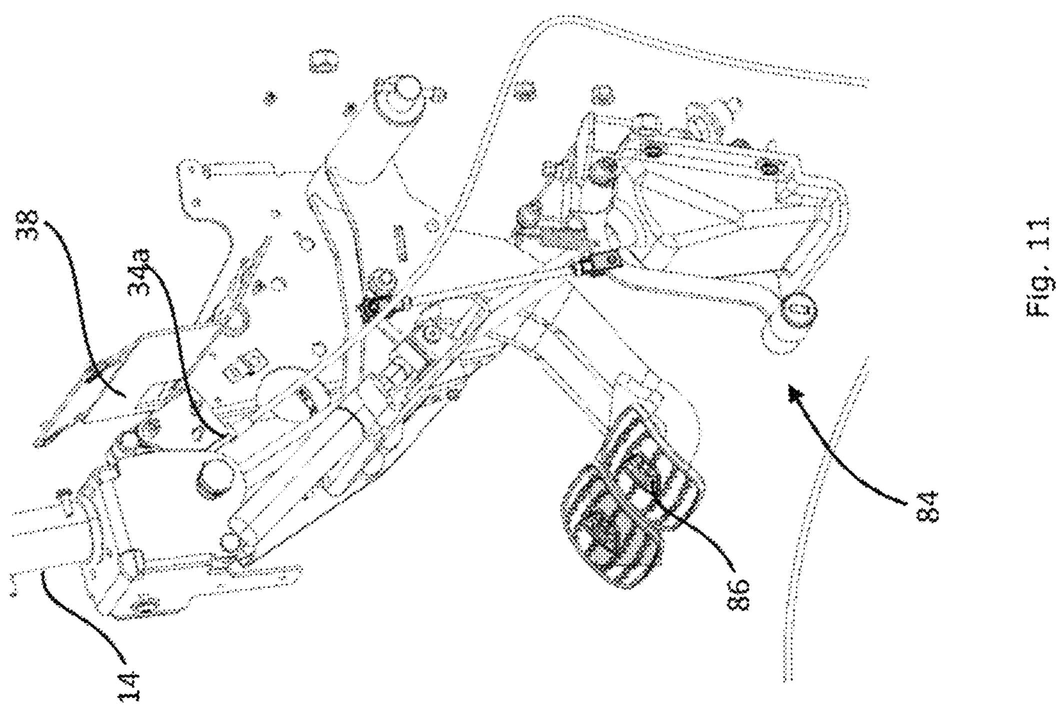
FIG. 11 is a partial view of the steer column of the embodiment of FIGS. 2-9 in the second position.
Figure 10:
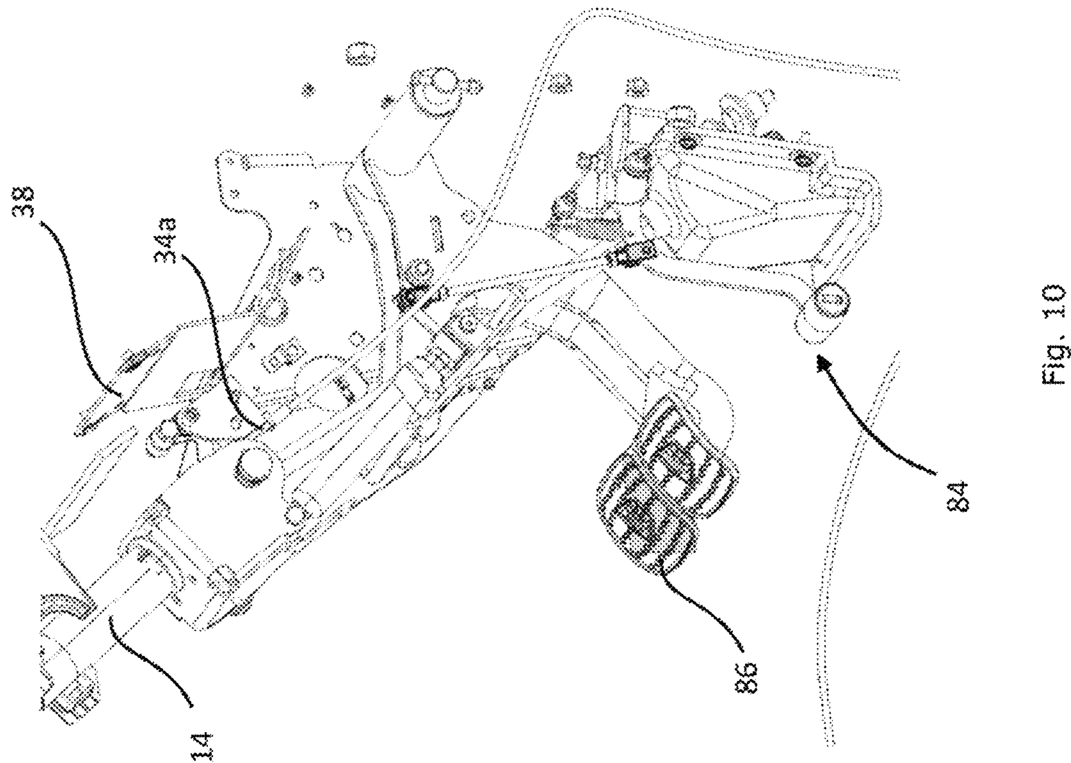
FIG. 10 is a partial view of the steer column of the embodiment of FIGS. 2-9 in the first position.

As shown in FIGS. 10 and 11, the steer column 14 includes a retention mechanism 84 that retains a steer column 14 in the first position and in the second position, as required. The working machine 10 also has a steer column release mechanism 86 for releasing the steer column 14 from the retained position, i.e. from the first position or the second position. The release mechanism is operable by an operator's foot. This provides a convenient arrangement by which the steer column can be moved from one position to another.

In an alternative embodiment, the actuator assembly is operated by some other means, rather than mechanically as described above.

Figure 14:
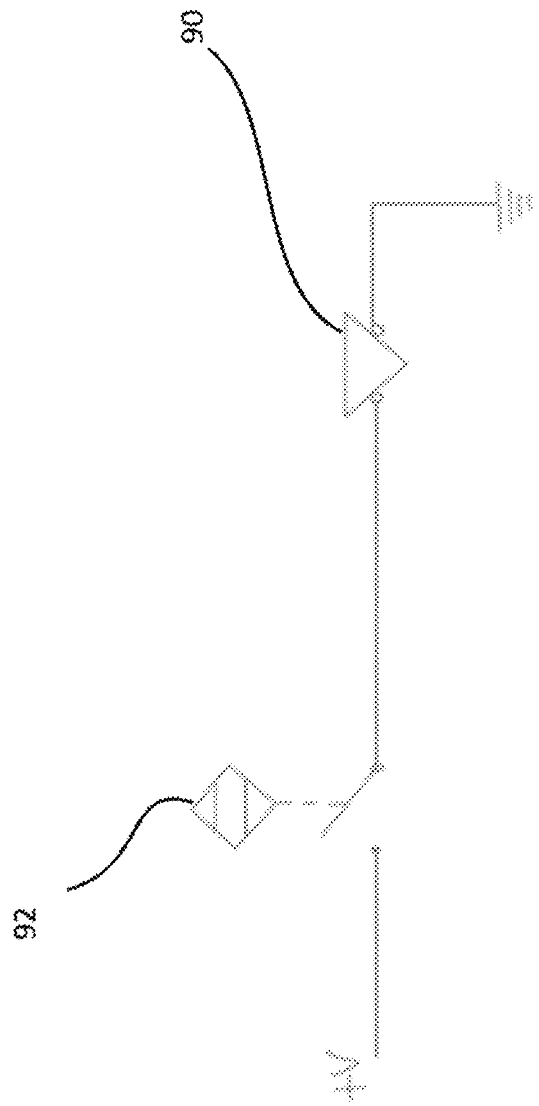
FIG. 14 is a schematic view of an actuation arrangement according to a further embodiment of the present teachings.

In one embodiment, shown in schematic form in FIG. 14, the latch control mechanism 18 comprises a seat interlock actuator 90. In this embodiment, the steer column 14 comprises a proximity switch 92 configured to operate the seat interlock actuator 90. When the steer column 14 is in the first position, the proximity switch 92 keeps the seat interlock actuator 90 deployed, such that release of the seat latch arrangement 16 is prevented. When the steer column 14 is in the second position, the proximity switch 92 operates the seat interlock actuator 90 to actuate the latch control mechanism 18 so as to enable release of the seat latch arrangement. Such a means of seat operation is simple and effective, and easily controlled by a seat operator.

Figure 15:
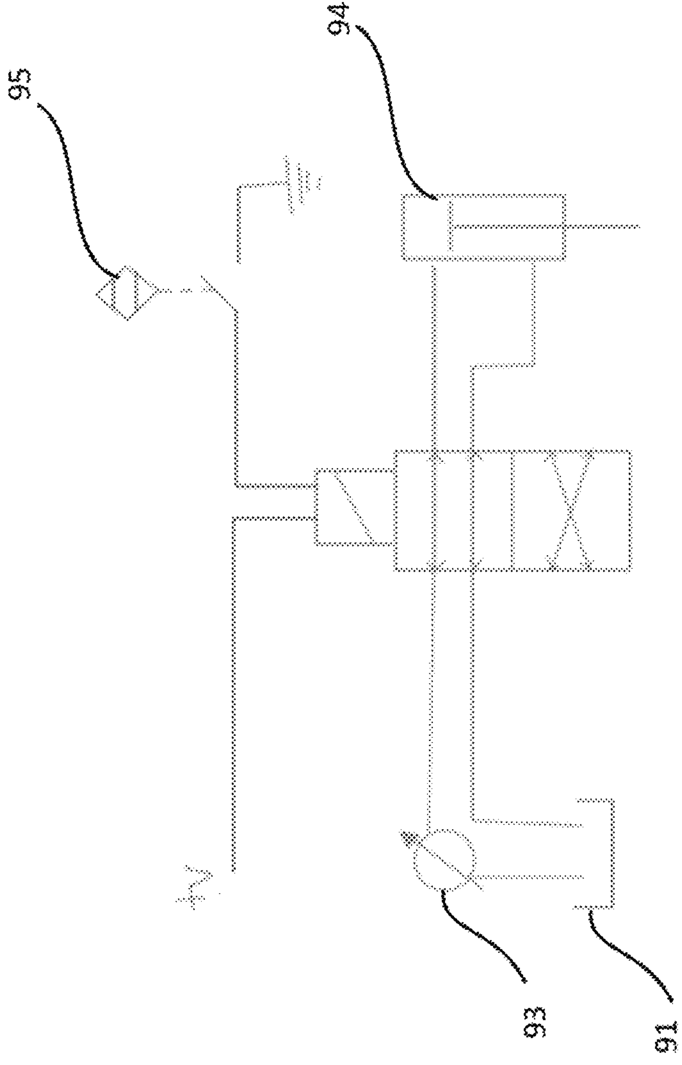
FIG. 15 is a schematic view of an actuation arrangement according to yet a further embodiment of the present teachings.

In a further embodiment, shown in FIG. 15, the latch control mechanism 18 of this embodiment includes a hydraulic ram 94 used to retain the seat 12 in the first position. The actuator assembly 30 includes a hydraulic tank 91 and a pump 93 for applying or releasing the hydraulic ram 94. In this embodiment, the steer column 14 comprises a proximity switch 95 configured to operate the hydraulic ram 90 depending on the position of the steer column 14. That is, when the steer column 14 is in the first position, as shown in FIG. 15, the hydraulic ram 94 retains the seat in the latched position. Upon movement of the steer column 14 to the second position, the proximity switch 95 closes, such that the hydraulic pump actuates the seat latch ram 94 so as to enable release of the seat latch arrangement. Such a means of seat operation is simple and effective, and easily controlled by a seat operator.

In an alternative embodiment, the actuator assembly is operated by some other suitable mechanical means.

The one or more embodiments are described above by way of example only and it will be appreciated that the variations are possible without departing from the scope of protection afforded by the appended claims.

The invention claimed is:

1. A working machine comprising:

a steer column; and a rotatable seat;

wherein the seat is rotatable through a seat rotation path between a first seat position and a second seat position; and wherein the steer column is movable between a first position, where the steer column is operable from the seat when the seat is in the first seat position, and a second position, where there is clearance between the steer column and the seat rotation path;

wherein the working machine further comprises:

a seat latch arrangement configured to retain the seat in said first seat position;

a latch control mechanism for controlling release of the seat latch arrangement, wherein the latch control mechanism is configured to prevent release of the seat latch arrangement when the steer column is in the first position; and an actuator assembly configured to actuate the latch control mechanism, wherein the actuator assembly is operated by movement of the steer column between the first position and the second position, and wherein the actuator assembly is configured to actuate the latch control mechanism to release the seat latch arrangement upon movement of the steer column to the second position.

2. The working machine according to claim 1, wherein the actuator assembly comprises an actuator having a first end connected to the steer column and a second end connected to the latch control mechanism.

3. The working machine according to claim 2, wherein the actuator comprises an inner cable housed within an outer tube; wherein the inner cable comprises a first end secured to the steer column and a second end secured to the latch control mechanism, and the outer tube comprises a first end secured to the steer column; wherein movement of the steer column to the second position is configured to tension the inner cable, so as to actuate the latch control mechanism.

4. The working machine according to claim 3, wherein the actuator assembly further comprises a pivot arrangement connected between the steer column and the actuator first end, wherein the pivot arrangement is configured such that movement of the steer column from the first position to the second position causes pivoting of the pivot arrangement such that the actuator actuates the latch control mechanism to release the seat latch arrangement.

5. The working machine according to claim 4, wherein the actuator comprises an inner cable housed within an outer tube; wherein the inner cable comprises a first end secured to the pivot arrangement and a second end secured to the latch control mechanism, and the outer tube comprises a first end secured to the pivot arrangement; wherein the pivot arrangement is configured to tension the inner cable upon movement of the steer column to the second position, so as to actuate the latch control mechanism.

6. The working machine according to claim 5, wherein the pivot arrangement comprises a plate configured to pivot about a pivot point, wherein the plate has a first end connected to the steer column, and a second end to which the inner cable first end is secured, and wherein the plate first end is connected to the steer column so as to pivot about the pivot point upon movement of the steer column to the second position, so as to cause the plate second end to pivot about the pivot point, so as to tension the inner cable.

7. The working machine according to claim 6, wherein the pivot arrangement comprises a member secured to the plate, and a cam configured to act upon the member to pivot the plate about the pivot point upon movement of the steer column to the second position.

8. The working machine according to claim 1, wherein the working machine further comprises a cab floor, and wherein the actuator assembly extends at least in part beneath the cab floor.

9. The working machine according to claim 1, wherein the steer column is jointed, such that the steer column comprises a fixed part, and a movable part configured to be moved between the first position and the second position.

10. The working machine according to claim 1, wherein the seat latch arrangement comprises a latch release configured to release the seat latch arrangement, and wherein the latch control mechanism is configured to control operation of the latch release; wherein the latch control mechanism has a closed position in which operation of the latch release is inhibited, such that release of the seat latch arrangement is prevented, and an open position, in which operation of the latch release is enabled; optionally and wherein the latch release is a pivotable lever.

11. The working machine according to claim 10, wherein the latch control mechanism comprises a recess configured to receive the latch release; wherein the recess is movable between a first position in which operation of the latch release is inhibited, and a second position in which operation of the latch release is enabled.

12. The working machine according to claim 11, wherein the latch control mechanism comprises a plate, wherein the plate defines the recess, and wherein the plate is pivotable between a first plate position where the recess is in said first position, and a second plate position where the recess is in said second position.

13. The working machine according to claim 12, wherein the actuator assembly comprises an actuator having a first end connected to the steer column and a second end secured to the plate of the latch control mechanism, and wherein the actuator is configured to actuate pivoting of the plate from the first plate position to the second plate position.

14. The working machine according to claim 1, wherein the latch control mechanism is resiliently biased towards a closed position, where release of the seat latch arrangement is prevented.

15. The working machine according to claim 1, further comprising: a steer column retention mechanism configured to retain the steer column in the first position, and/or in the second position; and a steer column release mechanism configured to release the steer column from the first position and/or from the second position; wherein the steer column release mechanism is configured to be operable by an operator's foot.

16. The working machine according to claim 1, wherein the first and second seat positions are substantially 180° from one another.

17. The working machine according to claim 1, wherein the seat comprises an arm-mounted control.

18. The working machine according to claim 1, wherein the actuator assembly comprises a hydraulic actuator and/or an electrically operated actuator.

19. A working machine comprising:

a steer column; and a rotatable seat;

wherein the seat is rotatable through a seat rotation path between a first seat position and a second seat position; and wherein the steer column is movable between a first position, where the steer column is operable from the seat when the seat is in the first seat position, and a second position, where there is clearance between the steer column and the seat rotation path;

wherein the working machine further comprises:

a seat latch arrangement configured to retain the seat in said first seat position;

a latch control mechanism for controlling release of the seat latch arrangement, wherein the latch control mechanism is configured to prevent release of the seat latch arrangement when the steer column is in the first position; and an actuator assembly configured to actuate the latch control mechanism, wherein the actuator assembly is operated by movement of the steer column between the first position and the second position, wherein the actuator assembly comprises an actuator having a first end connected to the steer column and a second end connected to the latch control mechanism, wherein the actuator comprises an inner cable housed within an outer tube, wherein the inner cable comprises a first end secured to the steer column and a second end secured to the latch control mechanism, and the outer tube comprises a first end secured to the steer column, and wherein movement of the steer column to the second position is configured to tension the inner cable, so as to actuate the latch control mechanism.

20. A working machine comprising:

a steer column; and a rotatable seat;

wherein the seat is rotatable through a seat rotation path between a first seat position and a second seat position; and wherein the steer column is movable between a first position, where the steer column is operable from the seat when the seat is in the first seat position, and a second position, where there is clearance between the steer column and the seat rotation path;

wherein the working machine further comprises:

a seat latch arrangement configured to retain the seat in said first seat position;

a latch control mechanism for controlling release of the seat latch arrangement, wherein the latch control mechanism is configured to prevent release of the seat latch arrangement when the steer column is in the first position; and an actuator assembly configured to actuate the latch control mechanism, wherein the actuator assembly is operated by movement of the steer column between the first position and the second position, wherein the seat latch arrangement comprises a latch release configured to release the seat latch arrangement, and wherein the latch control mechanism is configured to control operation of the latch release, wherein the latch control mechanism comprises a recess configured to receive the latch release, and wherein the recess is movable between a first position in which operation of the latch release is inhibited, and a second position in which operation of the latch release is enabled.

* * * * *